(12) United States Patent
Schultheiss et al.

(10) Patent No.: US 12,099,137 B2
(45) Date of Patent: Sep. 24, 2024

(54) RADAR MODULE COMPRISING A MICROWAVE CHIP

(71) Applicant: VEGA Grieshaber KG, Wolfach (DE)

(72) Inventors: Daniel Schultheiss, Hornberg (DE); Christoph Müller, Oppenau (DE); Roland Baur, Koenigsfeld (DE)

(73) Assignee: VEGA Grieshaber KG, Wolfach (DE)

( * ) Notice: Subject to any disclaimer, the term of this patent is extended or adjusted under 35 U.S.C. 154(b) by 447 days.

(21) Appl. No.: 17/440,919

(22) PCT Filed: Mar. 23, 2020

(86) PCT No.: PCT/EP2020/057991
§ 371 (c)(1),
(2) Date: Sep. 20, 2021

(87) PCT Pub. No.: WO2020/200883
PCT Pub. Date: Oct. 8, 2020

(65) Prior Publication Data
US 2022/0163622 A1 May 26, 2022

(30) Foreign Application Priority Data
Apr. 2, 2019 (DE) ...................... 10 2019 204 680.0

(51) Int. Cl.
*G01S 7/03* (2006.01)
*G01F 23/284* (2006.01)
(52) U.S. Cl.
CPC .............. *G01S 7/03* (2013.01); *G01F 23/284* (2013.01); *G01S 7/032* (2013.01)

(58) Field of Classification Search
CPC ........ G01F 23/284; G01S 7/032; G01S 7/028; G01S 13/88; H01Q 1/225; H01Q 1/2283;
(Continued)

(56) References Cited

U.S. PATENT DOCUMENTS 5,382,959 A * 1/1995 Pett .................. H01Q 21/24
343/846
5,434,581 A * 7/1995 Raguenet ............. H01Q 21/205
343/846

(Continued)

FOREIGN PATENT DOCUMENTS

DE   10 2014 109 120 A1   12/2015
DE   10 2015 119 690 A1   5/2017
(Continued)

OTHER PUBLICATIONS

Russia Office Action and Search Report issued Apr. 22, 2022 in Russian Patent Application No. 2021122556, 8 pages.
(Continued)

*Primary Examiner* — Vladimir Magloire
*Assistant Examiner* — Michael W Justice
(74) *Attorney, Agent, or Firm* — Oblon, McClelland, Maier & Neustadt, L.L.P.

(57) ABSTRACT

A radar module configured for plant monitoring is provided, including: a microwave chip including a radar signal source configured to generate a radar signal; a coupling element connected to the radar signal source by a signal link; and a resonant cavity into which the coupling element projects, the coupling element being configured to couple the radar signal into the resonant cavity, and the resonant cavity being integrated in the microwave chip.

13 Claims, 2 Drawing Sheets

(58) Field of Classification Search
CPC ....... H01Q 1/3233; H01P 3/121; H01P 5/107; H01L 2223/6677; H01L 2223/6627
USPC ....... 342/175, 124; 343/700 R, 905, 700 MS
See application file for complete search history.

(56) References Cited

U.S. PATENT DOCUMENTS

| | | | |
|---|---|---|---|
| 5,929,728 A * | 7/1999 | Barnett | H01P 3/121 |
| | | | 333/248 |
| 7,075,480 B2 * | 7/2006 | Fehrenbach | G01S 7/032 |
| | | | 73/290 R |
| 7,692,588 B2 * | 4/2010 | Beer | H01Q 9/0457 |
| | | | 257/690 |
| 7,752,911 B2 * | 7/2010 | Schultheiss | G01F 23/284 |
| | | | 73/290 R |
| 9,368,881 B2 | 6/2016 | Lee et al. | |
| 9,488,719 B2 * | 11/2016 | Schmalenberg | G01S 13/02 |
| 9,496,610 B2 * | 11/2016 | Blech | H01Q 3/2676 |
| 10,103,447 B2 * | 10/2018 | Tong | H01L 31/0203 |
| 10,811,373 B2 * | 10/2020 | Zaman | H01L 23/66 |
| 10,998,279 B2 * | 5/2021 | Tschumakow | H01L 23/481 |
| 11,408,974 B2 * | 8/2022 | Mayer | G01F 23/284 |
| 2003/0201930 A1 | 10/2003 | Nagasaku et al. | |
| 2004/0004576 A1 * | 1/2004 | Anderson | H01Q 13/18 |
| | | | 343/770 |
| 2004/0160357 A1 | 8/2004 | Nagasaku et al. | |
| 2005/0093738 A1 | 5/2005 | Nagasaku et al. | |
| 2005/0225480 A1 * | 10/2005 | Fehrenbach | G01S 7/032 |
| | | | 73/290 R |
| 2007/0026567 A1 * | 2/2007 | Beer | H01L 24/24 |
| | | | 257/E23.114 |
| 2007/0109178 A1 * | 5/2007 | Schultheiss | G01F 23/284 |
| | | | 342/124 |
| 2008/0287085 A1 | 11/2008 | Forstner et al. | |
| 2013/0293436 A1 * | 11/2013 | Blech | H01P 1/182 |
| | | | 343/835 |
| 2015/0346322 A1 * | 12/2015 | Schmalenberg | H01Q 13/206 |
| | | | 342/175 |
| 2015/0364830 A1 * | 12/2015 | Tong | H01Q 23/00 |
| | | | 342/27 |
| 2015/0377682 A1 | 12/2015 | Gerding. et al. | |
| 2016/0301125 A1 | 10/2016 | Kim et al. | |
| 2017/0324135 A1 | 11/2017 | Blech et al. | |
| 2018/0375218 A1 | 12/2018 | Kamo et al. | |
| 2019/0063983 A1 | 2/2019 | Schultheiss et al. | |
| 2019/0067780 A1 | 2/2019 | Kirino et al. | |
| 2020/0043875 A1 * | 2/2020 | Zaman | H01P 5/107 |
| 2020/0066661 A1 * | 2/2020 | Tschumakow | H01P 7/065 |
| 2020/0217922 A1 * | 7/2020 | Mayer | H01Q 19/06 |
| 2020/0249067 A1 | 8/2020 | Mayer et al. | |

FOREIGN PATENT DOCUMENTS

| | | |
|---|---|---|
| DE | 10 2017 112 894 A1 | 12/2018 |
| EP | 1 357 395 A1 | 10/2003 |
| EP | 2 963 440 A1 | 1/2016 |
| EP | 3 450 931 A1 | 3/2019 |
| JP | 7-193423 A | 7/1995 |
| RU | 2 556 746 C2 | 7/2015 |
| RU | 2 564 453 C1 | 10/2015 |
| RU | 2 571 455 C2 | 12/2015 |
| WO | WO 90/13927 A1 | 11/1990 |
| WO | WO 2010/130293 A1 | 11/2010 |
| WO | WO 2016/202394 A1 | 12/2016 |
| WO | WO 2018/014951 A1 | 1/2018 |

OTHER PUBLICATIONS

International Search Report issued on Jun. 23, 2020 in PCT/EP2020/057991 filed Mar. 23, 2020, 2 pages.
English translation of International Preliminary Report on Patentability and Written Opinion issued Oct. 14, 2021 in PCT/EP2020/057991, 12 pages.
German Office Action Issued Mar. 2, 2020 in German Patent Application No. 10 2019 204 660.0, 6 pages.
Korean Office Action issued Jun. 7, 2023 in Korean Patent Application No. 10-2021-7029605 (with English Translation), 8 pages.

* cited by examiner

RADAR MODULE COMPRISING A MICROWAVE CHIP

REFERENCE TO RELATED APPLICATIONS

This application claims priority to German Patent Application No. 10 2019 204 680.0, filed Apr. 2, 2019, which is incorporated herein by reference in its entirety.

FIELD OF THE INVENTION

The invention relates to radar measurement technology for process automation. In particular, the invention relates to a radar module configured for plant monitoring, a radar measuring device with such a radar module, the use of a radar module for level measurement, limit level measurement or plant automation, and a method for manufacturing a radar module.

BACKGROUND

Radar measuring instruments are used for process automation, in particular for plant monitoring, such as level measurement, point level measurement or object detection.

The radar signals are generated by a radar signal source and coupled into a waveguide or antenna, from which the radar signals are then radiated in the direction of the object or filling material to be monitored.

Common waveguide coupling designs for this purpose have a metallic pin, a fin, a patch antenna or a similar structure. In most cases, the microwave signal is connected to a carrier plate by means of a bond connection with circuit components (e.g. microstrip structures). The antenna may also be integrated directly on the chip (antenna-on-chip), which however only produces a good directivity together with a dielectric lens.

Such radar modules are used, for example, in level radars and are designed for W-band frequencies in the 80 GHz range.

SUMMARY

It is an object of the present invention to disclose an alternative radar module configured for plant monitoring.

This task is solved by the objects of the independent patent claims. Further embodiments of the invention result from the sub-claims and the following description of embodiments.

A first aspect of the invention relates to a radar module adapted for use in automation technology, namely plant monitoring, comprising a microwave chip. The microwave chip comprises a radar signal source adapted to generate a radar signal. Also, it comprises a coupling element, wherein the coupling element and the radar signal source are connected with a signal connection, for example in the form of a microstrip line. However, since the connection is on the chip itself, a very short electrical connection to the circuit parts on the chip is most likely to be used. A resonant cavity is provided in the microwave chip into which the coupling element projects, the coupling element being arranged to couple the radar signal into the resonant cavity.

The term automation technology may be understood as a subfield of technology that includes measures for the operation of machines and plants without the involvement of humans. One goal of the related process automation is to automate the interaction of individual components of a plant in the chemical, food, pharmaceutical, petroleum, paper, cement, shipping or mining industries. For this purpose, a variety of sensors may be used, which are especially adapted to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density may be monitored and settings for the entire plant may be changed manually or automatically.

One subfield of automation technology concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle may be used for this purpose.

Another subfield of automation technology is factory/production automation. Applications for this may be found in a wide variety of industries such as automotive manufacturing, food production, the pharmaceutical industry or generally in the field of packaging. The aim of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

The system monitoring may, for example, be a level or limit level measurement. The radar module may also be set up to monitor a hazardous area of a machine, to detect or even recognize objects, for example as part of a hazardous area monitoring, or to detect and count objects on conveyor belts or to determine the mass flow of a bulk material on a conveyor belt.

The high frequency signal (radar signal) of the microwave chip does not have to be transferred to a printed circuit board first. This would usually be done using wire bonding as the connection technology, which may be disadvantageous in terms of RF technology. Flip-chip mounting is also possible here.

The signal connection between the radar signal source and the coupling element may be set up with as little attenuation as possible so that the sensitivity of the radar module is affected as little as possible. Since no bonding wires are provided for connecting the coupling element to the radar signal source, variations in the length and placement of the bonding wires cannot adversely affect the performance of the radar module.

Since the radar signal (microwave signal) may be coupled directly from the microwave chip into a waveguide or antenna, mechanical tolerances may be minimized, especially since the coupling element is part of the microwave chip.

In addition to the coupling element, the resonant cavity is also integrated in the chip. This is particularly advantageous for very high frequencies of, for example, over 200 GHz, since in this frequency range the structures and dimensions of the coupling element, the waveguide and the antenna are correspondingly small. In particular, the microwave chip with coupling may be used flexibly for different antennas.

It may be considered as a core aspect that a direct coupling of the radar signal from the microwave chip into the waveguide is performed, wherein the coupling element and a resonant cavity are part of the microwave chip. The coupling element and the resonant cavity may be smaller in size or of the same order of magnitude as the microwave chip dimensions.

According to one embodiment, the resonant cavity is formed by a metallic pot in which the microwave chip is entirely or at least partially arranged. The resonant cavity is part of the feed geometry and this is located in/on or around the chip. It is possible that the chip is placed in the resonant cavity.

For example, an area of the chip may be milled out so that the "pot" may be placed on top of the chip or the chip may be substantially entirely within the resonant cavity formed by the pot.

According to a further embodiment, the resonant cavity comprises a metallized bottom and a lateral metallization formed in the microwave chip. The lateral metallization may, for example, be in the form of an annular arrangement of vias.

According to another embodiment, the microwave chip comprises a cavity forming the resonant cavity. The inner surfaces of the cavity may be metallized.

According to a further embodiment, the radar module comprises a waveguide, configured for guiding the coupled radar signal in the direction of an object to be monitored, which is for example a filling material, a bulk material or a person.

According to a further embodiment, the radar module comprises a lens, configured for focusing the radar signal. The microwave chip, the waveguide and the lens may in particular be of one-piece design, i.e. may be joined together, for example, using a multi-component injection molding process.

According to a further embodiment, the waveguide is arranged on the top side of the microwave chip, wherein the bottom of the metallic pot is arranged on the bottom side of the microwave chip, such that the waveguide and the metallic pot at least partially enclose the microwave chip to form the resonant cavity. The signal connection between the coupling element and the radar signal source is arranged on the top or inside of the microwave chip.

According to a further embodiment, the coupling element comprises a coupling pin, a patch antenna or another structure suitable for coupling the radar signal. According to a further embodiment, the radar module comprises an antenna arranged to radiate the coupled radar signal towards the object to be monitored. The antenna is, for example, an antenna horn or the combination of a waveguide piece and an antenna horn or antenna connector connected thereto.

The microwave chip may have a top layer (also referred to as a top layer or top surface) and a bottom layer (also referred to as a bottom layer or bottom surface), wherein the signal connection between the coupling element and the radar signal source is disposed on the top layer or inside the microwave chip, and wherein the antenna is disposed on the bottom layer.

Thus, the radar signal to be radiated is transmitted through the chip by the coupling element and then radiated by the antenna.

According to a further embodiment, the radar module is configured to generate a radar signal with a transmission frequency of more than 200 GHz.

According to a further embodiment, the diameter of the resonant cavity is less than 1.5 mm.

According to another embodiment, the diameter of the resonant cavity is less than the diameter of the microwave chip.

Another aspect relates to a radar measurement device comprising a radar module described above and below.

Another aspect relates to the use of a radar module described above and below for level measurement, point level measurement or plant automation.

Another aspect relates to a method of manufacturing a radar module described above and below, comprising providing a radar signal source, a coupling element, a signal connection between the radar signal source and the coupling element, and a resonant cavity on or in a microwave chip, wherein the coupling element projects into the resonant cavity.

The resonance chamber may be formed, for example, in the form of a cavity in the chip, the inner walls of which are metallized. A continuous or interrupted annular metallization may also be provided to form the resonance cavity in the chip, for example in the form of several metallic leads arranged along a circular path, for example in the form of vias.

In the following, embodiments are described with reference to the figures. The illustrations are schematic and not to scale. If the same reference signs are used in the following figure description, these designate the same or similar elements.

SHORT DESCRIPTION OF THE FIGURES

DETAILED DESCRIPTION OF EMBODIMENTS

Figure 1:
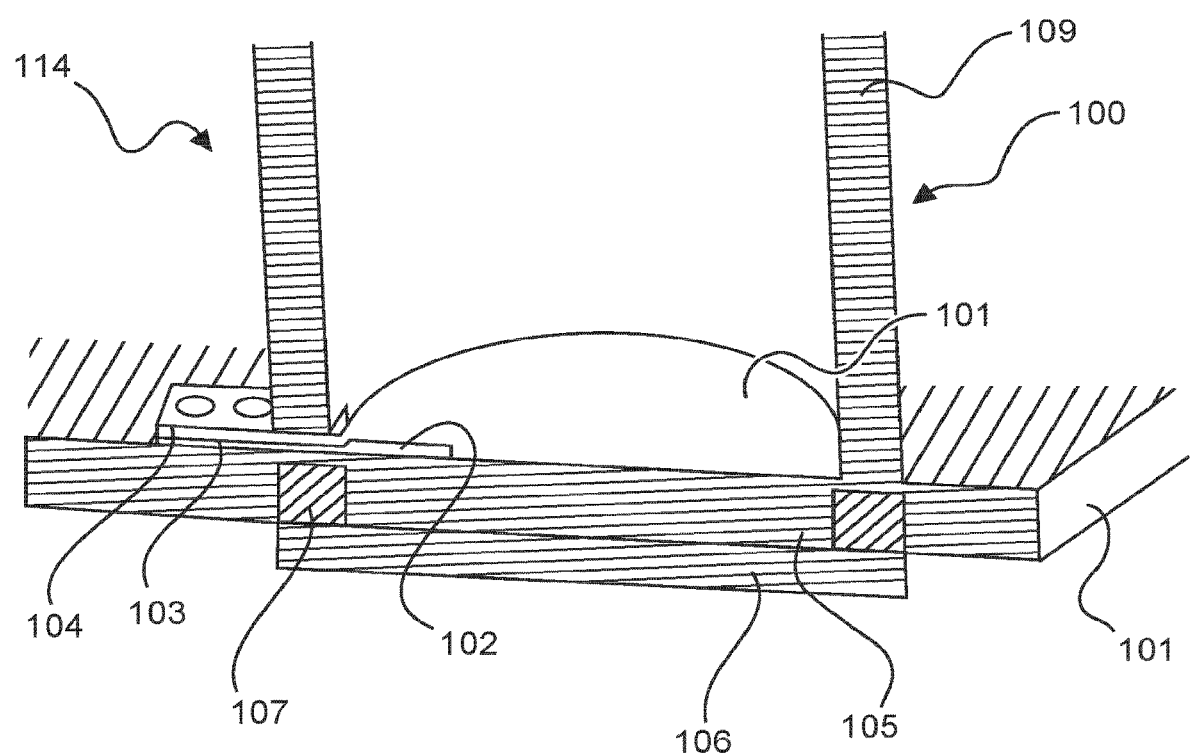
FIG. 1 shows a radar module according to one embodiment.

FIG. 1 shows a small section of a radar module 100 of a radar measuring device 114 according to an embodiment. The radar module is used in the field of process automation, in particular for plant monitoring.

It has a microwave chip 101 on or in which a radar signal source 104 is formed. A coupling element 102 is provided, for example a coupling pin or an antenna patch, the coupling element and the radar signal source being interconnected by means of a signal link 103. The chip itself forms a resonant cavity 105 surrounded by a metallization 106, 107. In the case of FIG. 1, this metallization is in the form of a metallic pot with a bottom 106 on the underside. The coupling element 102 is arranged to couple the radar signal generated by the radar signal source into the resonant cavity 105 and the waveguide 109. The waveguide 109 then transmits the coupled radar signal to an antenna, which radiates it towards the object to be monitored.

A direct coupling of the radar signal from the microwave chip into the waveguide 109 takes place. In the case of very high frequencies (greater than 200 GHz), the waveguide 109 has dimensions that are smaller than, or at least similar to, the dimensions of the microwave chip. For example, a circular waveguide 109 has a diameter of less than 1.5 mm in the frequency range above 200 GHz. The dimensions of the microwave chip are in a similar range. The waveguide 109 is fully coupled to or on the microwave chip.

On the chip surface (top layer) is the coupling element 102, for example in the form of a coupling pin. The waveguide 109 is arranged above this. This means that the chip is located (at least partially or even completely) within the waveguide or the adjoining pot 106, 107.

The resonant cavity 105 is made of the material of the microwave chip. The side walls of the "pot" so formed are metallized structures. The metallization at the bottom of the pot may be produced by grinding the chip to the appropriate thickness and then conductively bonding it to the bottom 106.

The coupling element 102 may be located on the top layer, or it may be provided in an inner layer of the microwave chip.

Figure 2:
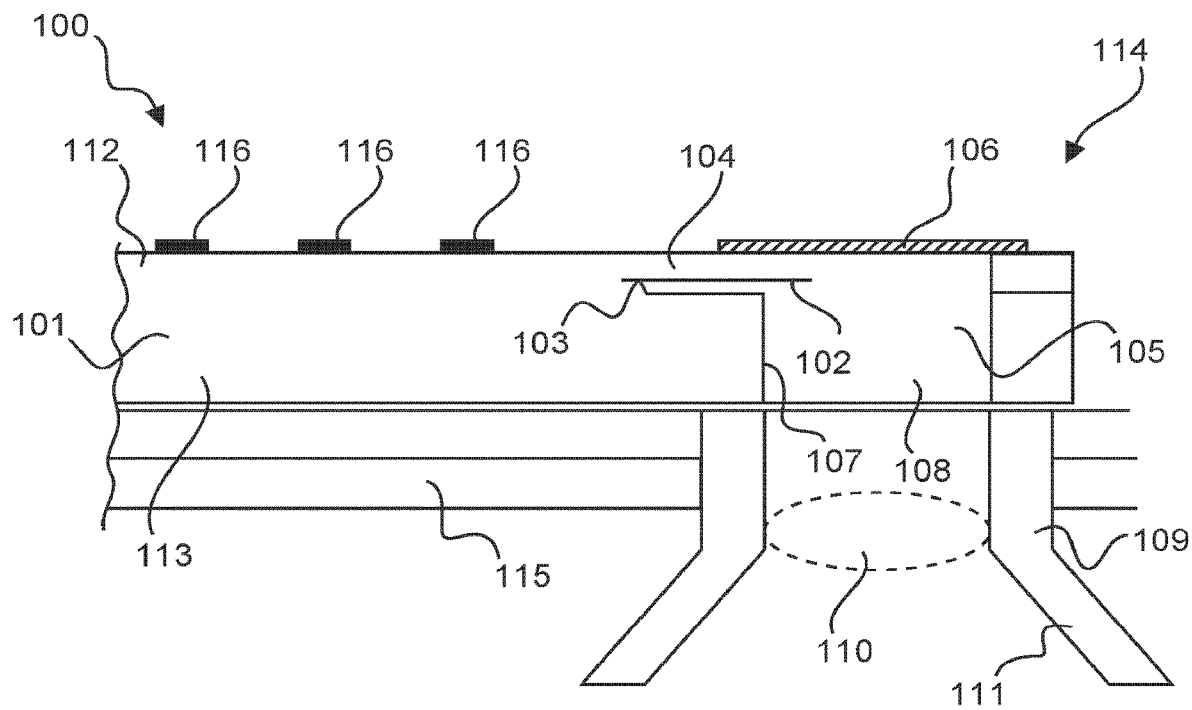
FIG. 2 shows a radar module according to a further embodiment.

A lens may be disposed over the entire arrangement or within the waveguide 109 for signal focusing (cf. lens 110 in FIG. 2). The lens may be mounted on the arrangement together with a piece-filled waveguide 109. Also, a small antenna horn 111 may be provided with a circular waveguide 109 (cf. FIG. 2).

In one embodiment, the chip is overmolded with a piece of waveguide, possibly including an optional lens, as an insert and may be used in a standard package form (QFN, . . . ) as an SMD component. The same applies to a small antenna horn with a corresponding round waveguide connection. The horn diameter is in the range of a few millimeters.

FIG. 2 shows a further design with the radiation direction rotated by 180°, i.e. through the chip. Here, the antenna 111 with the round waveguide connection 109 or the waveguide is placed on the back of the chip. Reference sign 112 here denotes the upper side of the chip (top layer), on which the bond pads 116 and the rear-side metallization 106 are arranged. Reference sign 113 denotes the back or bottom side of the microwave chip (bottom layer), on which the circular waveguide 109 with the antenna 111 is placed.

The chip must be placed precisely for this purpose. One advantage of this arrangement is that the remaining contacts 116 of the chip (for the supply, etc.) may be placed on the top layer. The mechanical connections for the antenna are located on the other side of the chip so that they cannot damage the bond connections.

The carrier 115 may receive the signals via the bond pads 116 and corresponding bond connections. The carrier 115 may be made of various materials. It may be implemented as a small wiring board. The antenna connector 109, 111 may be of various designs. The resonant cavity 105 is integrated into the chip, for example in the form of a cavity or recess 108. Alternatively to a recess, a metallization 107 is incorporated into the chip 101.

Figure 3:
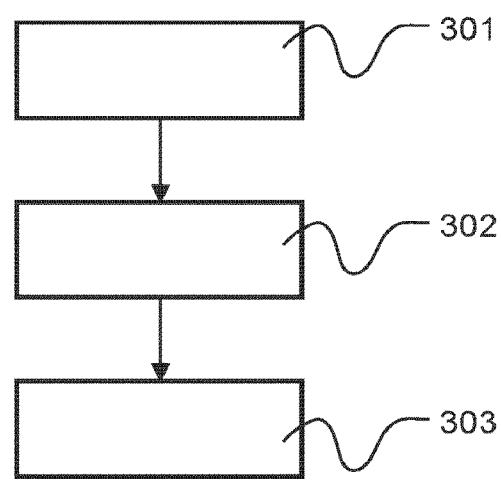
FIG. 3 shows a flow diagram of a method according to one embodiment.

FIG. 3 shows a flowchart of a method according to one embodiment. In step 301, a microwave chip comprising a radar signal source is fabricated. In step 302, a resonant cavity is created in the chip, in particular by providing a cylindrical continuous or interrupted metallization in the chip or, alternatively, on the inner wall of a recess in the chip. In step 303, a coupling element is connected to the radar signal source via a signal connection and projects into the resonant cavity. These steps may also be implemented in a different order.

Supplementally, it should be noted that "comprising" and "comprising" do not exclude other elements or steps, and the indefinite articles "a" or "one" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar module configured for plant monitoring, comprising:
    a microwave chip comprising:
        a radar signal source configured to generate a radar signal,
        a coupling element connected to the radar signal source by a signal link, and
        a resonant cavity into which the coupling element projects,
        wherein the coupling element is configured to couple the radar signal into the resonant cavity, and
        wherein the resonant cavity is integrated in the microwave chip;
    a waveguide arranged to guide the coupled radar signal towards an object to be monitored; and
    a lens arranged to focus the radar signal,
    wherein the microwave chip is integrally overmolded with a piece of the waveguide and the lens as an insert.

2. The radar module according to claim 1, wherein the resonant cavity is formed of a pot lined with conductive material, which is arranged in the microwave chip in whole or in part.

3. The radar module according to claim 1, wherein the resonant cavity has a metallized bottom and a side metallization formed in the microwave chip.

4. The radar module according to claim 1, wherein the microwave chip has a cavity forming the resonant cavity.

5. The radar module according to claim 1, wherein the waveguide is arranged at a top of the microwave chip and a bottom of the metallic pot is arranged at a bottom of the microwave chip so that the waveguide and the metallic pot at least partially surround the microwave chip and form the resonant cavity.

6. The radar module according to claim 1, wherein the coupling element is a coupling pin and/or a patch antenna.

7. The radar module according to claim 1,
    further comprising an antenna arranged to radiate the coupled radar signal in the direction of an object to be monitored,
    wherein the microwave chip further comprises a top layer and a bottom layer,
    wherein the signal link between the coupling element and the radar signal source is arranged on the top layer or inside the microwave chip, and
    wherein the antenna is located on the bottom layer.

8. The radar module according to claim 1, wherein the radar module is configured to generate a radar signal with a transmission frequency of more than 200 GHz.

9. The radar module according to claim 1, wherein a diameter of the resonant cavity is less than 1.5 mm.

10. The radar module according to claim 1, wherein a diameter of the resonant cavity is smaller than a diameter of the microwave chip.

11. The radar module according to claim 1, the radar module being further configured for level measurement, for point level measurement, or for plant automation.

12. A radar measurement device, comprising a radar module according to claim 1.

13. A method of manufacturing a radar module, comprising the steps of:
    providing a radar signal source, a coupling element, a signal connection between the radar signal source and the coupling element, and a resonant cavity on or in a microwave chip, wherein the coupling element projects into the resonant cavity,
wherein the coupling element is configured to couple the radar signal into the resonant cavity, and
wherein the resonant cavity is integrated in the microwave chip;
providing a waveguide arranged to guide the coupled radar signal towards an object to be monitored; and
providing a lens arranged to focus the radar signal,
wherein the microwave chip is integrally overmolded with a piece of the waveguide and the lens as an insert.

* * * * *